United States Patent [19]

Nishio et al.

[11] Patent Number: 4,563,712
[45] Date of Patent: Jan. 7, 1986

[54] FLOPPY DISK DRIVE APPARATUS

[75] Inventors: Yasuharu Nishio; Shunji Saito, both of Numazu, Japan

[73] Assignee: Tokyo Electric Co., Ltd., Tokyo, Japan

[21] Appl. No.: 566,500

[22] Filed: Dec. 29, 1983

[30] Foreign Application Priority Data

Jan. 14, 1983 [JP] Japan .................................. 58-4429

[51] Int. Cl.$^4$ ............................................ G11B 21/02
[52] U.S. Cl. .................................................... 360/75
[58] Field of Search ........................................ 360/75

[56] References Cited

U.S. PATENT DOCUMENTS

| 3,643,036 | 2/1972 | Takashima et al. | 360/75 |
| 4,291,346 | 9/1981 | Beecroft et al. | 360/75 |

FOREIGN PATENT DOCUMENTS

| 3216932 | 11/1982 | Fed. Rep. of Germany. | |
| 52-43409 | 4/1977 | Japan | 360/75 |
| 53-65708 | 6/1978 | Japan | 360/75 |
| 54-103326 | 8/1979 | Japan | 360/75 |
| 56-47963 | 4/1981 | Japan | 360/75 |
| 58-77064 | 5/1983 | Japan | 360/75 |
| 58-85975 | 5/1983 | Japan | 360/75 |
| 2082824 | 3/1982 | United Kingdom | 360/75 |
| 0694898 | 10/1979 | U.S.S.R. | 360/74 |

Primary Examiner—George G. Stellar
Attorney, Agent, or Firm—Frishauf, Holtz, Goodman & Woodward

[57] ABSTRACT

A floppy disk drive apparatus includes a drive section to drive a carrier, to which a magnetic head is attached, in the radial direction of a floppy disk. The drive apparatus further includes a detecting section for detecting when the magnetic head is located in the outer peripheral or inner peripheral limit location of the floppy disk, and a control section for interrupting the operation of the drive section in response to an output signal from the detecting section.

12 Claims, 8 Drawing Figures

FLOPPY DISK DRIVE APPARATUS

BACKGROUND OF THE INVENTION

The present invention relates to a floppy disk drive apparatus.

A floppy disk drive apparatus has a spindle drive section for driving a spindle on which a floppy disk is mounted, and a carrier drive section for moving a carrier to which a magnetic head is attached in the radial direction of the floppy disk. The floppy disk drive apparatus is coupled to a host computer and the operations of the spindle drive and carrier drive sections are controlled in accordance with control data generated from the host computer, thereby enabling data to be written in a desired location in the floppy disk and enabling data to be read out from a desired location.

Conventionally, in floppy disk drive apparatus of this kind, for example, even in the state in which the magnetic head exists in the outermost peripheral track location of the floppy disk, when an instruction signal to further move the carrier outwardly is generated from the host computer, the carrier drive section moves the carrier further outwardly in response to this instruction signal, so that this could cause the carrier to collide with the side wall of the housing. In this way when the carrier has collided with the side wall of the housing many times, there occurs a distortion in a transmission mechanism for transmitting the driving force from the carrier drive section to the carrier, so that it is impossible to accurately position the magnetic head in each track location of the floppy disk. A similar problem will also be caused when an instruction signal to further move the carrier inwardly while already in the innermost peripheral track location, is generated from the host computer.

SUMMARY OF THE INVENTION

It is an object of the present invention to provide a floppy disk drive apparatus which, when it detects that a carrier has reached the limit location in its movable range in the radial direction of a floppy disk, inhibits the driving of the carrier in the direction out of this movable range.

This object is acomplished by providing a floppy disk drive apparatus comprising a first drive section for rotating a floppy disk, a second drive section for driving a carrier to which a magnetic head is attached in the radial direction of the floppy disk, detection means for generating an output signal when either one of the outer peripheral and inner peripheral limit locations of the floppy disk is detected, and a control section for generating an inhibition signal to the second drive section in response to an output signal from the detecting means, thereby inhibiting the second drive section from driving the carrier over the above-mentioned outer peripheral or inner peripheral limit location.

In the present invention, when the carrier has reached the outer peripheral or inner peripheral limit location of the floppy disk, an inhibition signal is given to the second drive section for driving the carrier, thereby inhibiting the driving of the carrier in the direction over the outer peripheral or inner peripheral limit location. Therefore, this enables the carrier to be moved within only a range to be determined by the above-mentioned outer peripheral or inner peripheral limit location, thereby preventing the carrier from colliding with the side wall of the housing or with other parts.

DETAILED DESCRIPTION OF THE PREFERRED EMBODIMENTS

Figure 1:
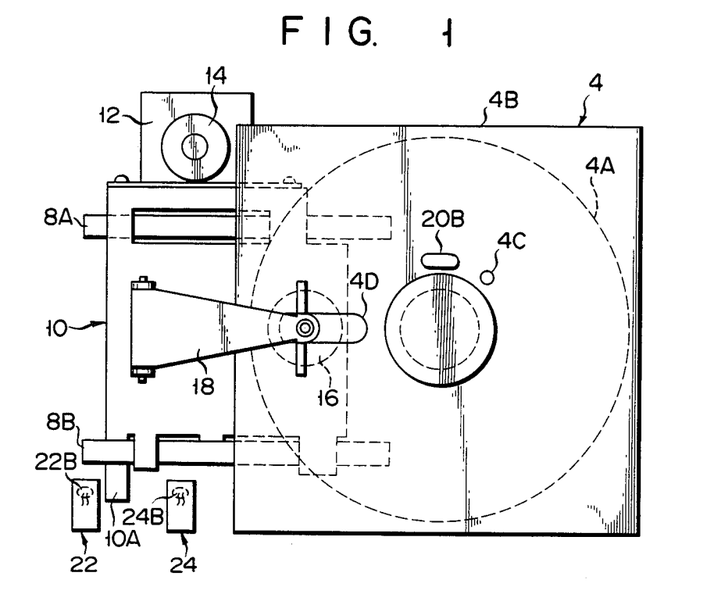
FIGS. 1 and 2 are a schematic top plan view and a side elevational view of a floppy disk drive apparatus according to one embodiment of the present invention.
Figure 2:
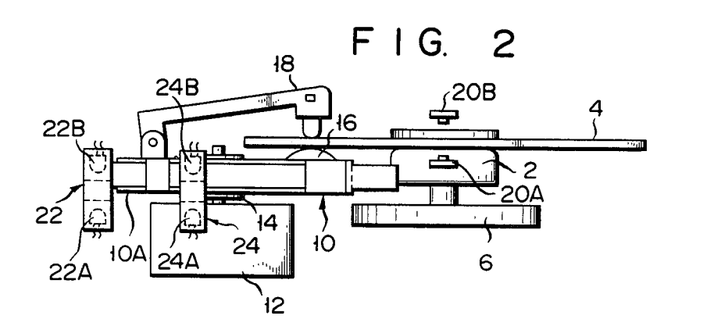

FIGS. 1 and 2 are a schematic top plan view and a side elevational view illustrating a floppy disk drive apparatus according to one embodiment of the present invention. This floppy disk driving apparatus comprises a spindle 2 for holding a floppy disk 4; a motor 6 for rotating the spindle 2; two fixed shafts 8A and 8B; a head carrier 10 slidably attached on these shafts 8A and 8B; and a motor 12 for driving the head carrier 10 along the shafts 8A and 8B through a pulley 14. The floppy disk 4 has a disk medium 4A and a casing 4B for enclosing this disk medium 4A. An index hole 4C is formed in the floppy disk 4, while a long hole 4D extending in the radial direction of the disk medium 4A is formed in the casing 4B. A magnetic head 16 and a pressure-contacting member 18 for pressing the disk medium 4A onto the magnetic head 16 through the long holes 4D are attached on and over the head carrier 10. Furthermore, the floppy disk drive device has an index sensor formed of a light emitting diode 20A and a phototransistor 20B for generating an output signal when the index hole 4C of the floppy disk 4 is detected; and outer peripheral and inner peripheral limit location detectors 22 and 24 for generating inhibition signals to a motor control circuit (not shown) for driving the motor 12 when a projecting portion 10A of the carrier 10 is detected, thereby inhibiting the movement of the carrier 10 out of a predetermined range. This outer peripheral limit location detector 22 is constituted by a light emitting diode 22A and a phototransistor 22B, while the inner peripheral limit location detector 24 is constituted by a light emitting diode 24A and a phototransistor 24B.

Figure 3:
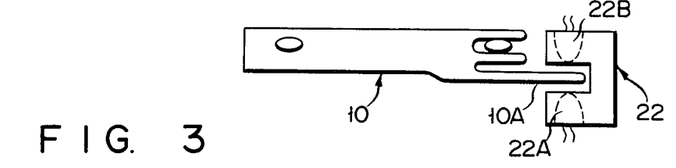
FIG. 3 is a diagram to explain the relative positional relationship between the carrier and the outer peripheral limit location detector shown in FIGS. 1 and 2.

FIG. 3 shows the positional relationship between the outer peripheral limit location detector 22 and the carrier 10. This detector 22 generates an output signal when the light emitted from the light emitting diode 22A to the phototransistor 22B is interrupted by the projecting portion 10A of the carrier 10. Similarly, the detector 24 also generates an output signal when the light emitted from the light emitting diode 24A to the phototransistor 24B is interrupted by the projecting portion 10A.

Figure 4:
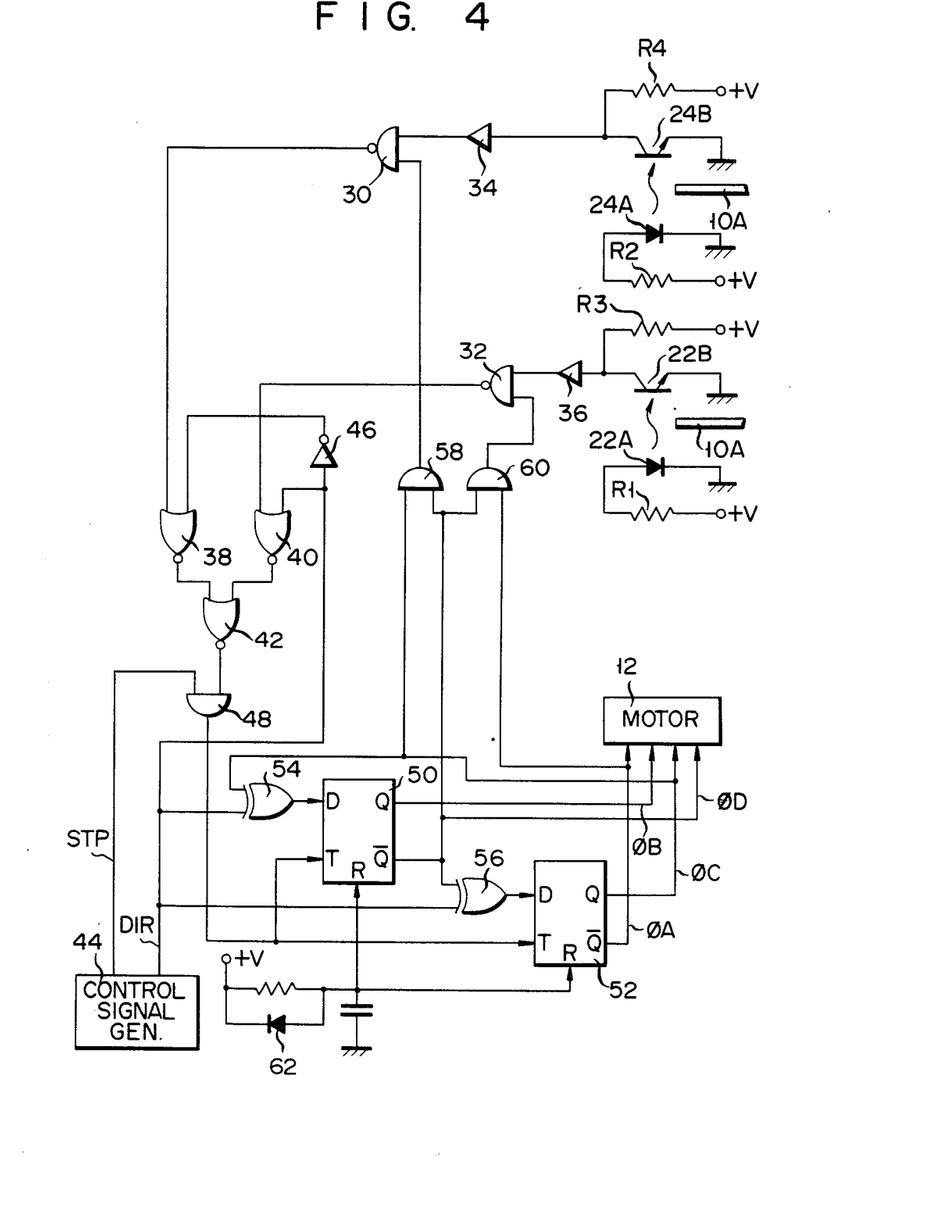
FIG. 4 is a circuit diagram of a floppy disk drive apparatus having outer peripheral and inner peripheral limit location detectors according to one embodiment of the present invention.

FIG. 4 is a circuit diagram of a main part of a floppy disk drive apparatus according to one embodiment of the present invention. In this circuit, light emitting diodes 22A and 24A are energized by currents supplied from a power supply terminal +V through respective resistors R1 and R2, and emit the light. The emitters of the phototransistors 22B and 24B are grounded and the collectors are connected to the power supply terminal +V through respective resistors R3 and R4. The collectors of these phototransistors 22B and 24B are also connected to one input terminal of NAND gates 30 and 32 through buffers 34 and 36, respectively. The output terminals of these NAND gates 30 and 32 are connected to one input terminal of NOR gates 38 and 40 whose output terminals are connected to two input terminals of a NOR gate 42. In addition, a direction instruction signal DIR from a control signal generating circuit 44 is supplied through an inverter 46 to the other input terminal of the NOR gate 38 and is directly supplied to the other input terminal of the NOR gate 40. An output terminal of the NOR gate 42 is connected to one input terminal of an AND gate 48 which receives at the other input terminal a step signal STP from the control signal generating circuit 44. An output terminal of the AND gate 48 is connected to T input terminals of flip-flops 50 and 52. An output terminal of an exclusive OR gate 54 whose one input terminal is connected to a Q output terminal of the flip-flop 52 is coupled to a D input terminal of this flip-flop 50. An output terminal of an exclusive OR gate 56 whose one input terminal is connected to a $\bar{Q}$ output terminal of the flip-flop 50 is coupled to a D input terminal of the flip-flop 52. The direction instruction signal DIR from the control signal generating circuit 44 is supplied to the other input terminal of these exclusive OR gates 54 and 56. The Q and $\bar{Q}$ output terminals of the flip-flop 52 are respectively connected to the other input terminals of AND gates 58 and 60 which are connected at one input terminal to the $\bar{Q}$ output terminal of the flip-flop 50. Output terminals of these AND gates 58 and 60 are connected to the other input terminals of the NAND gates 30 and 32, respectively. In addition, an initial reset circuit 62 is connected to reset terminals of the flip-flops 50 and 52. $\bar{Q}$ and Q output signals from the flip-flop 52 are supplied as motor drive signals $\phi_A$ and $\phi_C$ and Q and $\bar{Q}$ output signals of the flip-flop 50 are supplied as motor drive signals $\phi_B$ and $\phi_D$ to the stepping motor 12.

The operation of the circuit shown in FIG. 4 will now be described hereinbelow. When the power supply is first turned on, the flip-flops 50 and 52 are reset by the initial reset circuit 62. It is now considered that the magnetic head 16 is driven toward the outer periphery of the floppy disk 4. Assume also that a step signal STP is generated from the control signal generating circuit 44 and at the same time a direction instruction signal at "0" level is generated therefrom. Since both phototransistors 22B and 24B are conductive in this case, a "1" signal is generated from the NOR gate 42. Thus, the pulse signal STP from the control signal generating circuit 44 is supplied through the AND gate 48 to the trigger terminals of the flip-flops 50 and 52. The output states of the flip-flops 50 and 52 are changed in response to this pulse signal STP, causing the logic state of the drive signals $\phi_A$, $\phi_B$, $\phi_C$, and $\phi_D$ to be changed in accordance with a predetermined sequence. Due to this, the motor 12 is rotated for example in the forward direction and the head 16 is driven in the outer peripheral direction of the floppy disk 4. When the magnetic head 16 reaches near the outer peripheral limit location of the floppy disk 4 and the light from the light emitting diode 22A to the phototransistor 22B is interrupted by the projecting portion 10A of the carrier 10, the phototransistor 22B is rendered nonconductive, so that a "1" level signal is supplied from the buffer 36 to the NAND gate 32. When Q output signals of "1" are generated from the flip-flops 50 and 52 in this state, namely, when the drive signals $\phi_A$ (="1"), $\phi_B$ (="0"), $\phi_C$ (="0"), and $\phi_D$ (="1") are generated, a signal "1" is supplied from the AND gate 60 to the NAND gate 32. Thus, a signal "0" is generated from the NAND gate 32 and signals "1" and "0" are generated from the NOR gates 40 and 42 respectively, thereby disabling the AND gate 48. This inhibits the step signal STP from the control signal generating circuit 44 from being supplied through the AND gate 48 to the trigger terminals of the flip-flops 50 and 52. Therefore, the rotation of the motor 12 in the forward direction is inhibited and the magnetic head 16 is prevented from being further driven in the outer peripheral direction of the floppy disk 4, so that the magnetic head 16 is stopped in the outer peripheral limit location. When the direction instruction signal DIR from the control signal generating circuit 44 is changed to the "1" level in this state, a signal "1" is generated from the NOR gate 40 to cause a signal "1" to be generated from the NOR gate 42, thereby enabling the AND gate 48. Consequently, the step signal STP from the control signal generating circuit 44 is supplied through this AND gate 48 to the trigger terminals of the flip-flops 50 and 52, thereby allowing these flip-flops 50 and 52 to be set into the "1" and "0" output states, respectively. As described above, whenever the step signal is generated from the control signal generating circuit 44, the output states of the flip-flops 50 and 52 are changed and the logic states of the drive signals $\phi_A$, $\phi_B$, $\phi_C$ and $\phi_D$ are changed in accordance with a sequence different from that in the former case. Due to this, the motor 12 is rotated reversely and the magnetic head 16 is driven in the inner peripheral direction of the floppy disk 4. When the magnetic head 16 reaches near the inner peripheral limit location of the floppy disk 4 and the light from the light emitting diode 24A to the phototransistor 24B is interrupted by the projecting portion 10A of the carrier 10, the phototransistor 24B is made nonconductive, so that a "1" level signal is supplied from the buffer 34 to the NAND gate 30. When a $\bar{Q}$ output signal of "1" and a Q output signal of "1" are generated respectively from the flip-flops 50 and 52 in this state, namely, when the drive signals $\phi_A$(="0"), $\phi_B$(="0"), $\phi_C$(="1"), and $\phi_D$(="1") are generated, a signal "1" is supplied from the AND gate 58 to the NAND gate 30. Thus, a signal "0" is generated from the NAND gate 30 and signals "1" and "0" are respectively generated from the NOR gates 38 and 42, thereby disabling the AND gate 48. Due to this, the step signal STP from the control signal generating circuit 44 is prevented from being supplied to the trigger terminals of the flip-flops 50 and 52 through the AND gate 48. As a result, the rotation of the motor 12 in the reverse direction is inhibited and the magnetic head 16 is prevented from being further driven in the inner peripheral direction of the floppy disk 4; eventually, this magnetic head 16 is stopped in the inner peripheral limit location. The motor 12 is not rotated so long as the direction instruction signal DIR at the "1" level is generated from the control signal generating circuit 44; therefore, the magnetic head 16 is held in the inner peripheral limit location.

As described above, in this embodiment, when the magnetic head 16 is driven in the outer peripheral or inner peripheral direction of the floppy disk 4 and is stopped in the outer peripheral or inner peripheral limit location, even if the step signal STP is further generated from the control signal generating circuit 44, the magnetic head 16 will be continuously held in the outer peripheral or inner peripheral limit location. Therefore, the carrier 10 is prevented from colliding with the side wall of the housing.

In addition, in this embodiment, it is possible to set the outer peripheral limit location to the outermost peripheral track location of the floppy disk 4 and to set the inner peripheral limit location to the innermost peripheral track location of the floppy disk, or to a location inside of this innermost peripheral track.

Figure 5:
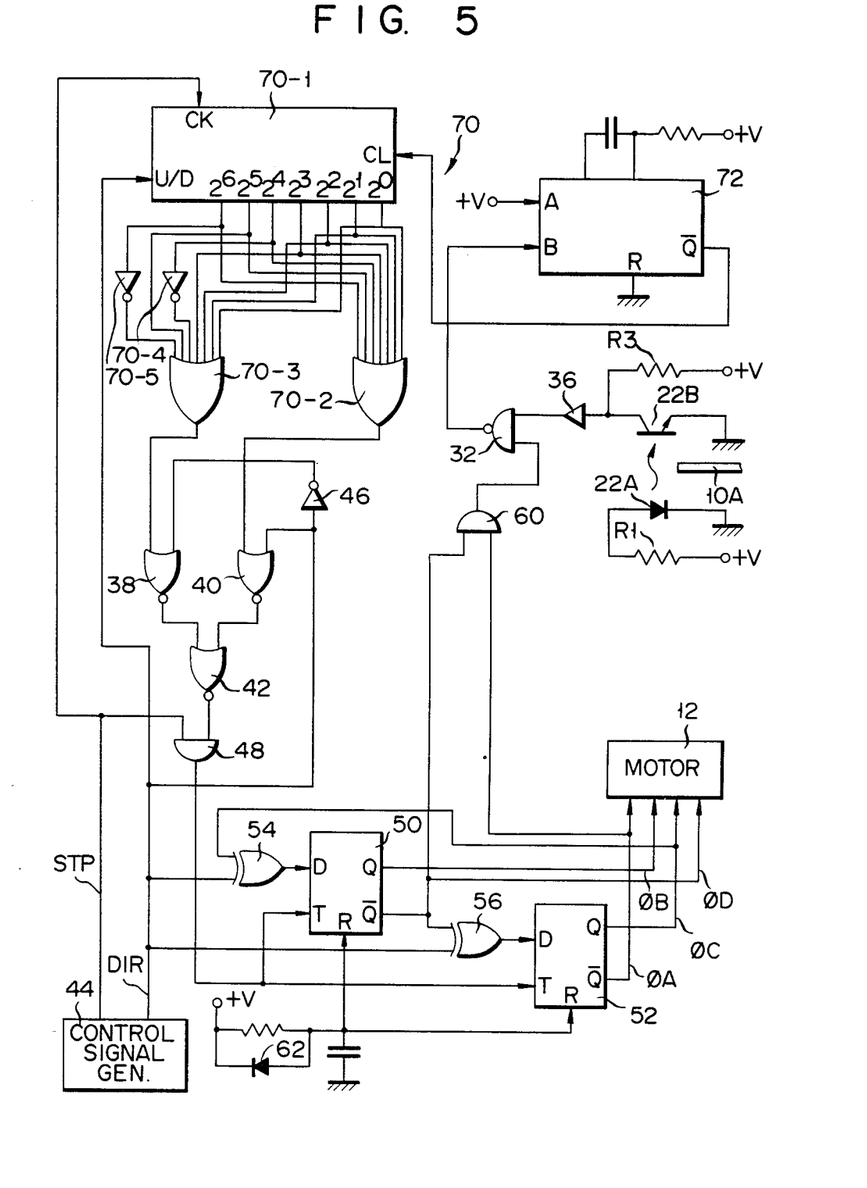
FIG. 5 is a circuit diagram of a floppy disk drive apparatus having an outer peripheral limit location detector and a counter circuit according to another embodiment of the present invention.

FIG. 5 illustrates a circuit diagram of a main part of a floppy disk drive apparatus according to another embodiment of the present invention. This circuit is constituted in a manner substantially similar to that shown in FIG. 4 except that the inner peripheral limit location detector 24 formed of the light emitting diode 24A and the phototransistor 24B, buffer 34, NAND gate 30, and AND gate 58 are removed, and that this circuit is equipped with a counter circuit 70 and a monostable multivibrator 72. This counter circuit 70 comprises an up-down counter 70-1 for counting the step signal STP from the control signal generating circuit 44; an OR gate 70-2 coupled to output terminals $2^0$ to $2^6$ of the counter 70-1; and an OR gate 70-3 coupled to the output terminals $2^0$ to $2^3$ and $2^5$ of the counter 70-1 and at the same time coupled to the output terminals $2^4$ and $2^6$ through inverters 70-4 and 70-5, respectively. The direction instruction signal DIR from the control signal generating circuit 44 is supplied to an up-down terminal of the counter 70-1. The monostable multivibrator 72 clears the count data of the counter 70-1 by generating a $\overline{Q}$ output signal at a low level in response to a "0" level signal from the NAND gate 32.

Assume now that the step signal STP is generated from the control signal generating circuit 44 and at the same time the direction instruction signal DIR of "0" level is generated to drive the magnetic head 16 in the outer peripheral direction of the floppy disk 4. In this case, the counter 70-1 is set into the downcounting mode by the direction instruction signal DIR of "0" level from the control signal generating circuit 44. When the magnetic head 16 reaches near the outer peripheral limit location of the floppy disk 4 and the phototransistor 22B is rendered nonconductive, the output signal of the NAND gate 32 becomes "0" level when the $\overline{Q}$ output signals at "1" level are generated from the flip-flops 50 and 52 as described previously. Due to this, the $\overline{Q}$ output signal at a low level is generated from the monostable multivibrator 72, thereby clearing the count data of the counter 70-1. Thus, all output signals at the output terminals $2^0$ to $2^6$ of the counter 70-1 become "0" level. Due to this, a "0" level signal is generated from the OR gate 70-2 and "1" and "0" level signals are respectively generated from the NOR gates 40 and 42, thereby disabling the AND gate 48. Thus, the rotation in the forward direction of the motor 12 is stopped and the magnetic head 16 is set into the outermost peripheral track location or track "0" position of the floppy disk 4. In this case of course, even if the step signal STP is further generated from the control signal generating circuit 44, the motor 12 will not be driven so long as the direction instruction signal at "0" level is generated. When the direction instruction signal at "1" level is then generated from the control signal generating circuit 44 to drive the magnetic head 16 in the inner peripheral direction, "0" and "1" level signals are respectively generated from the NOR gates 40 and 42, thereby enabling the AND gate 48 and at the same time causing the counter 70-1 to be set into the up-counting mode. When the step signal STP is generated from the control signal generating circuit 44 in this state, the logic state of the drive signals $\phi_A$, $\phi_B$, $\phi_C$ and $\phi_D$ from the flip-flops 50 and 52 is sequentially changed, thereby permitting the motor 12 to be rotated in the reverse direction. In addition, at this time, the counter 70-1 is counted up by one count each time the step signal is supplied. When this up-counting operation advances and the count value of the counter 70-1 becomes "80", namely, when the magnetic head 16 reaches the track "80" position or rest position of the floppy disk 4, signals "0" are generated from the output terminals $2^0$ to $2^3$ and $2^5$ of the counter 70-1, while signals "1" are generated from the output terminals $2^4$ and $2^6$. Due to this, a "0" level signal is generated from the OR gate 70-3 and "1" and "0" level signals are respectively generated from the NOR gates 38 and 42, thereby disabling the AND gate 48. As a consequence, the step signal STP cannot be supplied to the trigger terminals of the flip-flops 50 and 52 and the rotation of the motor 12 is stopped and the magnetic head 16 is continuously held in the track "80" position of the floppy disk 4. Thereafter, when the direction instruction signal at "0" level is generated from the control signal generating circuit 44, the output states of the flip-flops 50 and 52 are changed responsive to the step signal STP, so that the motor 12 is rotated in the forward direction.

Figure 6:
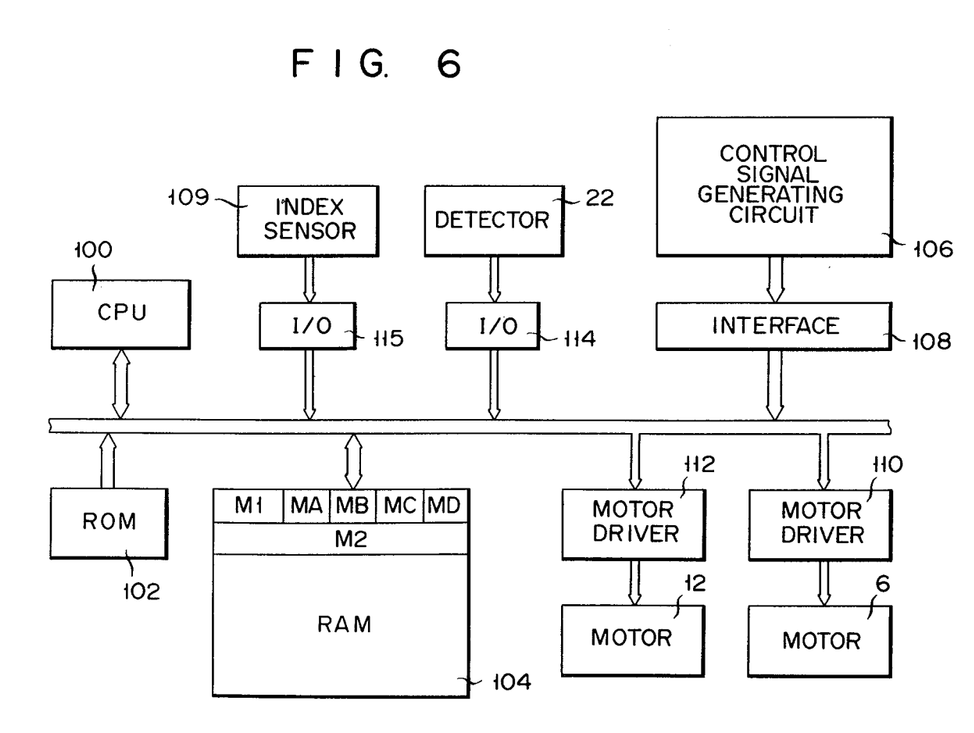
FIG. 6 is a block diagram of a floppy disk drive apparatus having a CPU according to still another embodiment of the present invention.

FIG. 6 is a block diagram of a floppy disk drive apparatus according to still another embodiment of the present invention. This floppy disk drive apparatus has a central processing unit (CPU) 100; a read only memory (ROM) 102 and a random access memory (RAM) 104 which are coupled to the CPU 100 through a data bus; and a control signal generating circuit 106 coupled to the CPU 100 through an interface 108. Furthermore, the motors 6 and 12, outer peripheral limit location detector 22, and an index sensor 109 are coupled to the CPU 100 through motor drivers 110 and 112, and I/O ports 114 and 115, respectively.

The RAM 104 has a memory area M1 for storing data to prevent the magnetic head 16 from being driven in the inner peripheral direction immediately after the power supply is turned on; memory areas MA, MB, MC, and MD for storing the data corresponding to the drive signals $\phi_A$, $\phi_B$, $\phi_C$ and $\phi_D$; and a memory area M2 for storing the data representing the track position of the floppy disk 4 at which the magnetic head 16 exists.

The control signal generating circuit 106 generates the step signal STP and direction instruction signal DIR which are necessary to drive the motor 12, and a motor control signal necessary to drive the motor 6, and the like in response to key signals from, e.g., an external keyboard circuit.

Figure 7:
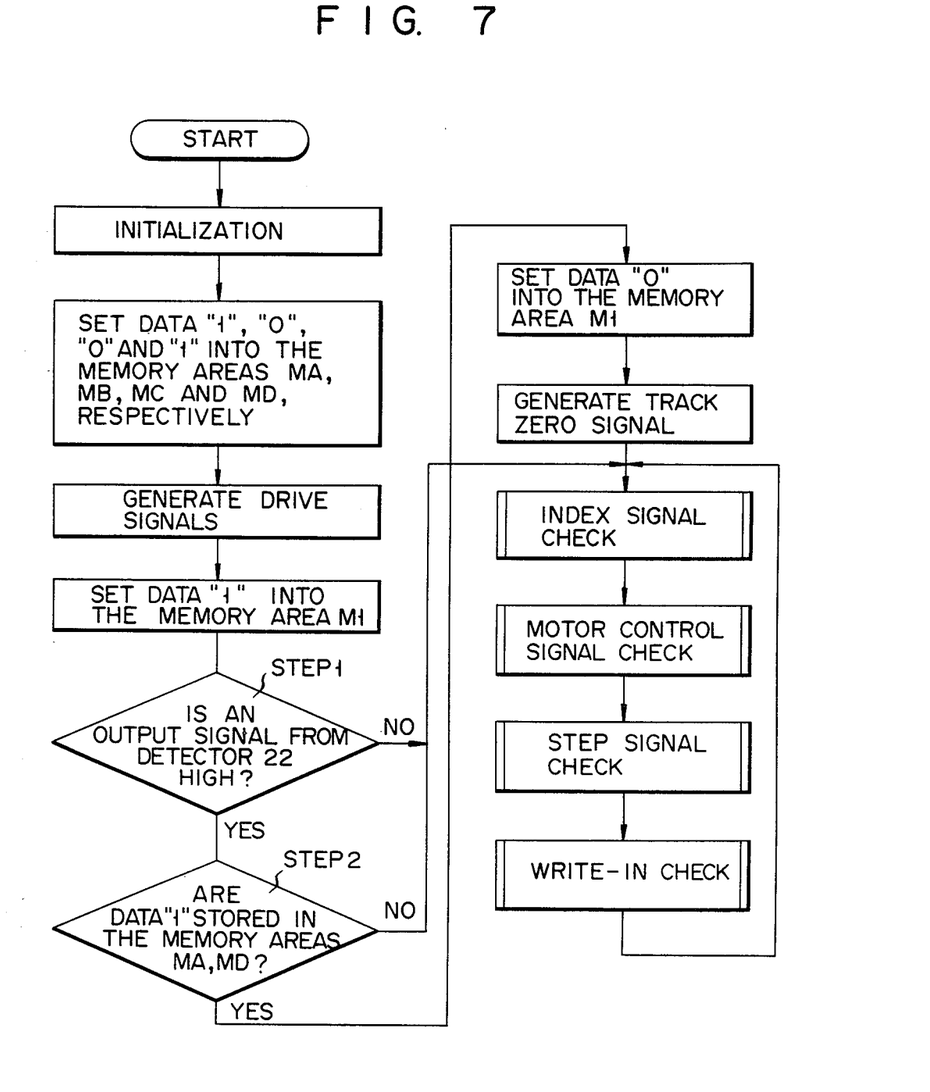
FIG. 7 is a flowchart of a main routine to be executed by the CPU shown in FIG. 6.

The CPU 100 executes a main routine such as shown in FIG. 7 on the basis of program data stored in the ROM 102. Firstly, when the power supply is turned on, an initialization processing such as to clear all contents of the RAM 104 and the like is executed. Next, data "1", "0", "0", and "1" are set into the memory areas MA, MB, MC and MD in the RAM 104, respectively, and at the same time the drive signals $\phi_A$, $\phi_B$, $\phi_C$ and $\phi_D$ in accordance with the contents of these memory areas MA, MB, MC and MD are supplied to the motor driver 112. Subsequently, data "1" is set into the memory area M1. Then, it is checked whether an output signal at a high level is generated from the detector 22 or not, namely, whether the light from the light emitting diode 22A is interrupted by the projecting portion 10A of the carrier 10 or not (in STEP 1). In the case where it is detected that the output signal at a high level is generated from the detector 22 in STEP 1, it is further checked whether or not data "1", "0", "0" and "1" are stored in the memory areas MA, MB, MC and MD respectively (in STEP 2). In the case where an answer "YES" is obtained in this STEP 2, the CPU 100 sets data "0" into the memory area M1 and at the same time generates a track "0" signal representing that the magnetic head 16 is at present in the zero track position. If the answer is "NO" in STEP 1 or 2, the CPU 100 executes an index signal check to control the rotation of the motor 6 in response to an output signal from the index sensor 109; a motor control signal check to control the rotation of the motor 6 in response to a motor control signal from the control signal generating circuit 106; a step signal check which will be described later with reference to FIG. 8; and a write-in check to execute the read-write operation to the floppy disk 4 through the magnetic head 16 in response to a write/read signal from the control signal generating circuit 106.

Figure 8:
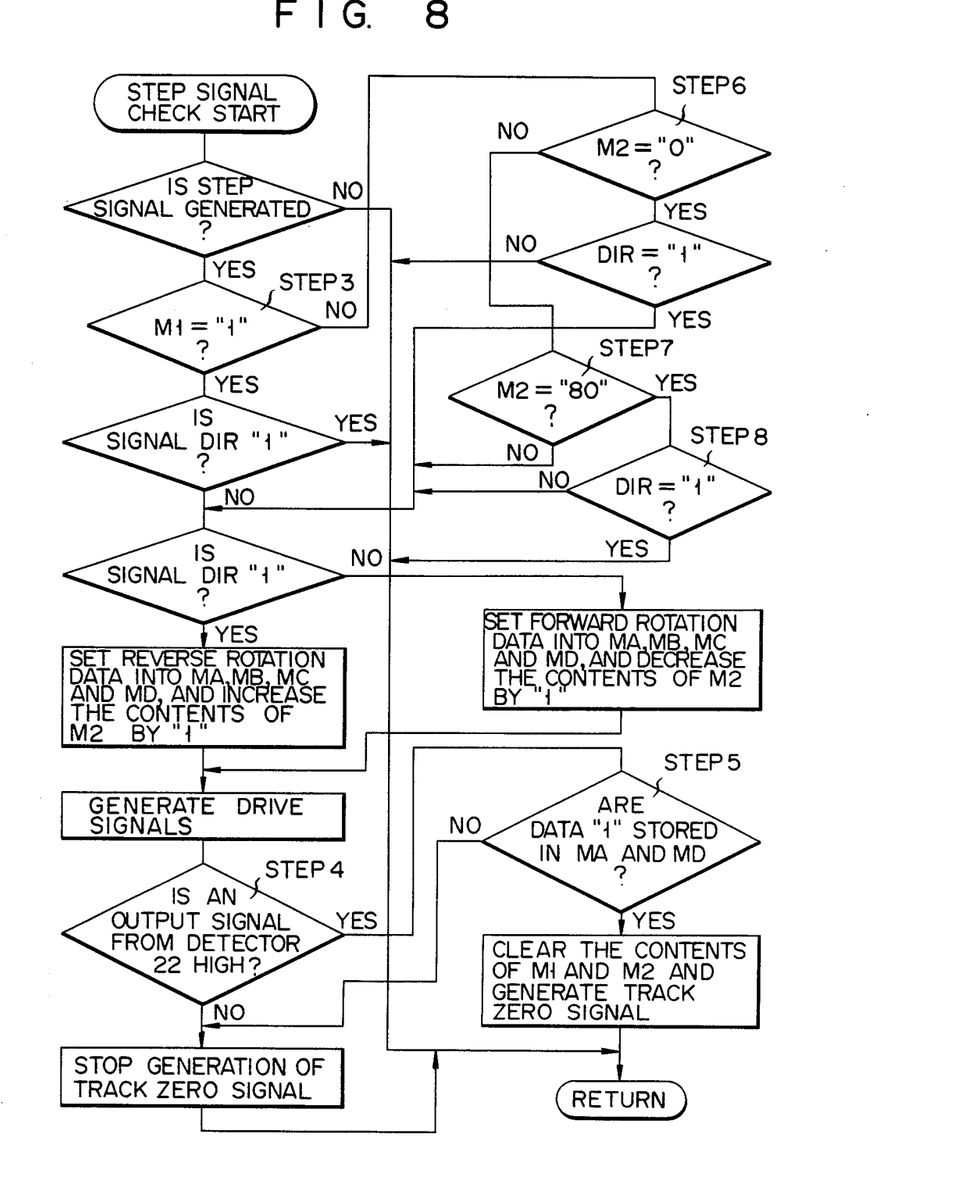
FIG. 8 is a flowchart of a step signal check included in the main routine shown in FIG. 7.

In the execution of the subroutine of the step signal check shown in FIG. 8, the CPU 100 first checks whether or not the step signal STP is generated from the control signal generating circuit 106. When it is detected that the step signal STP is not generated in this step, the CPU 100 performs the next processing in the main routine, i.e., the subroutine of the motor control signal check. In addition, when it is detected that the step signal is generated in this step, the CPU 100 checks whether or not data "1" is stored in the memory area M1 in STEP 3. If it is detected that data "1" is stored in the memory area M1 in this STEP 3, the CPU 100 checks whether the direction instruction signal DIR from the control signal generating circuit 106 is at "1" level or not. If it is detected that this direction instruction signal DIR is at "1" level in this step, the CPU 100 returns to the main routine. If it is detected that the direction instruction signal DIR is at "0" level in this step, the CPU 100 stores data such as to allow the motor 12 to be rotated in the forward direction in the memory areas MA, MB, MC and MD, respectively, and at the same time it reduces the content of the memory area M2 by one count. Thereafter, the drive signals $\phi_A$, $\phi_B$, $\phi_C$ and $\phi_D$ responsive to the contents of the memory areas MA, MB, MC and MD are generated, thereby causing the motor 12 to be rotated by one step in the forward direction to move the magnetic head 16 by one track in the outer peripheral direction. Next in STEP 4, the CPU 100 checks whether or not an output signal from the detector 22 is at a high level, namely, whether the light from the light emitting diode 22A is interrupted by the projecting portion 10A or not. In the case where it is detected that a low-level signal is generated from the detector 22 in this step, the CPU 100 stops the generation of a track "0" signal. In addition, if it is detected that a high-level signal is generated from the detector 22 in STEP 4, the CPU 100 checks in STEP 5 whether or not data "1", "0", "0" and "1" are stored in the memory areas MA, MB, MC and MD, respectively, namely, whether or not the magnetic head is in the track "0" position. If an answer in this STEP 5 is "YES", the CPU 100 clears the contents of the memory areas M1 and M2 and thereafter generates a track "0" signal. If the answer is "NO" in this STEP 5, the CPU 100 stops the generation of a track "0" signal.

In the case where data "0" is set into the memory area M1 in STEP 3, the CPU 100 checks whether or not data "0" is stored in the memory area M2 in STEP 6. In the case an answer in this STEP 6 is "YES", i.e., if it is detected that the magnetic head 16 is in the track "0" position, it is checked whether or not the direction instruction signal DIR is at "1" level. When it is detected that the direction instruction signal at "0" level is generated, the CPU 100 returns the processing to the main routine; while in the case where it is detected that the direction instruction signal at "1" level is generated, the CPU 100 writes data for allowing the motor 12 to be rotated in the reverse direction in the memory areas MA, MB, MC and MD and at the same time increases the content of the memory area M2 by one count. Thereafter, the drive signals $\phi_A$, $\phi_B$, $\phi_C$ and $\phi_D$ responsive to the contents of the memory areas MA, MB, MC and MD are generated to move the magnetic head 16 by one track in the inner peripheral direction, and then the processing in the previously-described STEP 4 is executed. In addition, if it is detected that data "1" is stored in the memory area M2 in STEP 6, the CPU 100 checks whether data "80" is stored in the memory area M2 or not, i.e., whether or not the magnetic head 16 exists in the inner peripheral limit location (in STEP 7). If an answer is "YES" in this STEP 7, it is checked whether or not the direction instruction signal DIR is at "1" level in STEP 8. In the case where it is detected that the direction instruction signal DIR at "1" level is generated, the CPU 100 returns the processing to the main routine. On the other hand, in the case where an answer is "NO" in STEP 7 or 8, the data to rotate the motor 12 forwardly is written in the memory areas MA, MB, MC and MD as described previously and the content of the memory area M2 is reduced by one count, and thereafter the magnetic head 16 is moved by one track in the outer peripheral direction.

Assume now that the magnetic head 16 is moved in the outer peripheral direction in the state in that data "1" is stored in the memory area M1 and the movement of the magnetic head 16 in the inner peripheral direction is inhibited. In this case, in STEP 3, it is detected that data "1" is stored in the memory area M1 and that the direction instruction signal DIR at "0" level is generated, the CPU 100 writes the data to rotate the motor 12 in the forward direction in the memory areas MA, MB, MC and MD and at the same time reduces the content of the memory area M2 by one count, and thereafter it supplies the drive signals $\phi_A$, $\phi_B$, $\phi_C$ and $\phi_D$ to the motor driver 112, thereby rotating the motor 12 by one step in the forward direction. Due to this, the magnetic head 16 is moved by one track in the outer peripheral direction. Similar operations are repeatedly executed so long as the step signal and direction intruction signal at "1" level are generated from the control signal generating circuit 106. Thereafter, when the magnetic head 16 reaches near the outer peripheral limit location and the light from the light emitting diode 22A to the phototransistor 22B is interrupted by the projecting portion 10A, the CPU 100 detects that a high-level signal is generated from the detector 22 in STEP 4 and then executes the processing of STEP 5. In this STEP 5, the CPU 100 generates the drive signals $\phi_A$, $\phi_B$, $\phi_C$ and $\phi_D$ to further rotate the motor 12 in the forward direction until it is detected that data "1", "0", "0" and "1" are stored in the memory areas MA, MB, MC and MD in this STEP 5. If it is detected that data "1", "0", "0" and "1" are respectively stored in the memory areas MA, MB, MC and MD in this STEP 5, the CPU 100 clears the contents of the memory areas M1 and M2 and generates a track "0" signal. In the case where the subroutine of this step signal check is executed in the subsequent cycle, it is detected that data "0" are stored in the memory areas M1 and M2 in STEPs 3 and 6 and it is further detected that the direction instruction signal at "0" level is generated, and this step signal check subroutine is completed. Thereafter, when the direction instruction signal DIR from the control signal generating circuit 106 becomes "1" level, the CPU 100 writes the data to rotate the motor 12 reversely in the memory areas MA, MB, MC and MD and at the same time increases the content of the memory area M2 by one count. Then, the drive signals $\phi_A$, $\phi_B$, $\phi_C$ and $\phi_D$ responsive to the data in the memory areas MA, MB, MC and MD are generated, thereby causing the magnetic head 16 to be moved by one track in the inner peripheral direction. Furthermore, thereafter, the processings of STEPs 4 and 5 are executed and then the CPU 100 stops the generation of a track "0" signal. In the subroutine of the step signal check in the subsequent cycle, the magnetic head 16 is moved by one track at a time in the inner peripheral direction and the content of the memory area M2 is also increased by one count. If it is detected in STEP 7 that the count data of the memory area M2 becomes "80" in this way, after it was detected that the direction instruction signal at "1" level is generated in STEP 8, the CPU 100 finishes the subroutine of this step signal check without step-driving the motor 12.

As described above, even in this embodiment, an effect similar to that in the embodiment shown in FIG. 5 is derived.

Although the present invention has been described with respect to the foregoing embodiments, the present invention is not limited to only these embodiments.

For example, in the embodiment shown in FIG. 6, it is possible to omit the memory area M2 of the RAM 104 and to use the inner peripheral limit location detector 24 shown in FIG. 1. In this case, for example, when a high-level output signal is generated from the inner peripheral limit location detector 24 and at the same time the drive signals $\phi_A$ (="0"), $\phi_B$ (="0"), $\phi_C$ (="1"), and $\phi_D$ (="1") are generated, the CPU 100 inhibits the rotation of the motor 12 and inhibits the magnetic head 16 from further being driven in the inner peripheral direction.

In addition, in the embodiment shown in FIG. 5, the OR gate 70-2 may be omitted and an output signal of the NAND gate 32 may be supplied to one input terminal of the NOR gate 40.

What is claimed is:

1. A floppy disk drive apparatus, comprising:
   a control signal generating circuit for generating a step signal and a direction instruction signal indicative of one of an inner and an outer peripheral direction;
   first drive means for rotating a floppy disk;
   second drive means for driving a carrier to which a magnetic head is attached, in the radial direction of said floppy disk, as determined by said direction instruction signal and in response to said step signal;
   detecting means for generating an output signal when it detects that said magnetic head is located in the outer peripheral limit location of said floppy disk; and
   control means for generating an inhibition signal to said second drive means in response to both an output signal from said detecting means and said direction instruction signal, indicative of the outer peripheral direction, to inhibit said second drive means from driving said magnetic head over said outer peripheral limit location of said floppy disk, said second drive means being inhibited from driving said magnetic head until said direction instruction signal is changed to indicate an inner peripheral direction.

2. A floppy disk drive apparatus according to claim 1, wherein said carrier has a projecting portion and said detecting means includes a first detection circuit constituted by a first light emitting diode and a first phototransistor to detect this projecting portion.

3. A floppy disk drive apparatus according to claim 2, wherein said detecting means further includes a second detection circuit to generate an output signal when it detects that said magnetic head is in said inner peripheral limit location, and said control means generates the inhibition signal to said second drive means in response to an output signal from said second detection circuit and a direction instruction signal indicative of an inner peripheral direction, for inhibiting said second drive means from driving said magnetic head over said inner peripheral limit location.

4. A floppy disk drive apparatus according to claim 3, wherein said second drive means has a motor and a motor drive circuit to drive this motor in response to said step signal and said direction instruction signal, and wherein said control means has a control circuit to inhibit said step signal in response to an output signal from one of said first and second detection circuits and to drive signals in a predetermined phase relationship from said motor drive circuit.

5. A floppy disk drive apparatus according to claim 3, wherein said second detection circuit is constituted by a first light emitting diode and a first phototransistor to detect this projecting portion.

6. A floppy disk drive apparatus, comprising:
   a control signal generating circuit for generating a step signal and a direction instruction signal indicative of one of an inner and an outer peripheral direction;
   first drive means for rotating a floppy disk;
   second drive means for driving a carrier to which a magnetic head is attached, in the radial direction of said floppy disk, as determined by said direction instruction signal and in response to said step signal;
   detecting means for generating an output signal when it detects that said magnetic head is located in the outer peripheral limit location of said floppy disk, wherein said detecting means includes a counter circuit to count step signals from said control signal generating circuit and to generate an output signal when the count data reaches a predetermined value; and
   control means for generating an inhibition signal to said second drive means in response to both an output signal from said detecting means and said direction instruction signal, indicative of the outer peripheral direction, to inhibit said second drive means from driving said magnetic head over said outer peripheral limit location of said floppy disk, said second drive means being inhibited from driving said magnetic head until said direction instruction signal is changed to indicate an inner peripheral direction.

7. A floppy disk drive apparatus according to claim 6, wherein said counter circuit has a counter which is set into the up- and down-counting modes in response to a direction instruction signal from said control signal generating circuit, and a first logic circuit to generate an output signal responsive to output data of said counter to said control means when the count data of said counter reaches said predetermined value.

8. A floppy disk drive apparatus according to claim 7, wherein said second drive means has a motor and a motor drive circuit to drive this motor in response to said step signal and said direction instruction signal, and wherein said control means has a control circuit to inhibit said step signal in response to an output signal from said first logic circuit and to drive signals in a predetermined phase relationship from said motor drive circuit.

9. A floppy disk drive apparatus according to claim 7, wherein said counter circuit further has a second logic circuit to supply an output signal responsive to output data generated from said counter to said control means when said counter is reset in response to an output signal from said first detection circuit.

10. A floppy disk drive apparatus according to claim 9, wherein said second drive means has a motor and a motor drive circuit to drive this motor in response to said step signal and said direction instruction signal, and wherein said control means has a control circuit to inhibit said step signal in response to an output signal from one of said first and second logic circuits and to drive signals in a predetermined phase relationship from said motor drive circuit.

11. A floppy disk drive apparatus, comprising:
a control signal generating circuit for generating a step signal and a direction instruction signal indicative of one of an inner and an outer peripheral direction;
first drive means for rotating a floppy disk;
second drive means for driving a carrier to which a magnetic head is attached, in the radial direction of said floppy disk, as determined by said direction instruction signal and in response to said step signal;
detecting means for generating an output signal when it detects that said magnetic head is located in the outer peripheral limit location of said floppy disk; and
control means for generating an inhibition signal to said second drive means in response to both an output signal from said detecting means and said direction instruction signal, indicative of the outer peripheral direction, to inhibit said second drive means from driving said magnetic head over said outer peripheral limit location of said floppy disk, said second drive means being inhibited from driving said magnetic head until said direction instruction signal is changed to indicate an inner peripheral direction;
wherein said control means includes memory means for storing data relating to drive signals responsive to the step signal and the direction instruction signal from said control signal generating circuit, and a data processor for interrupting the operation of said second drive means when an output signal is generated from said detecting means and when it is detected that the data indicative of the drive signals in a particular phase relationship are stored in said memory means.

12. A floppy disk drive apparatus according to claim 11, wherein said memory means includes a memory area, and said control means includes a power-ON detector for producing an output signal when a power is turned ON, and said data processor writes specified data into said memory area in response to an output signal from said power-ON detector and preventing said second drive means from driving said magnetic head towards the center of the floppy disk.

* * * * *